No. 784,314.                                                                  Patented March 7, 1905.

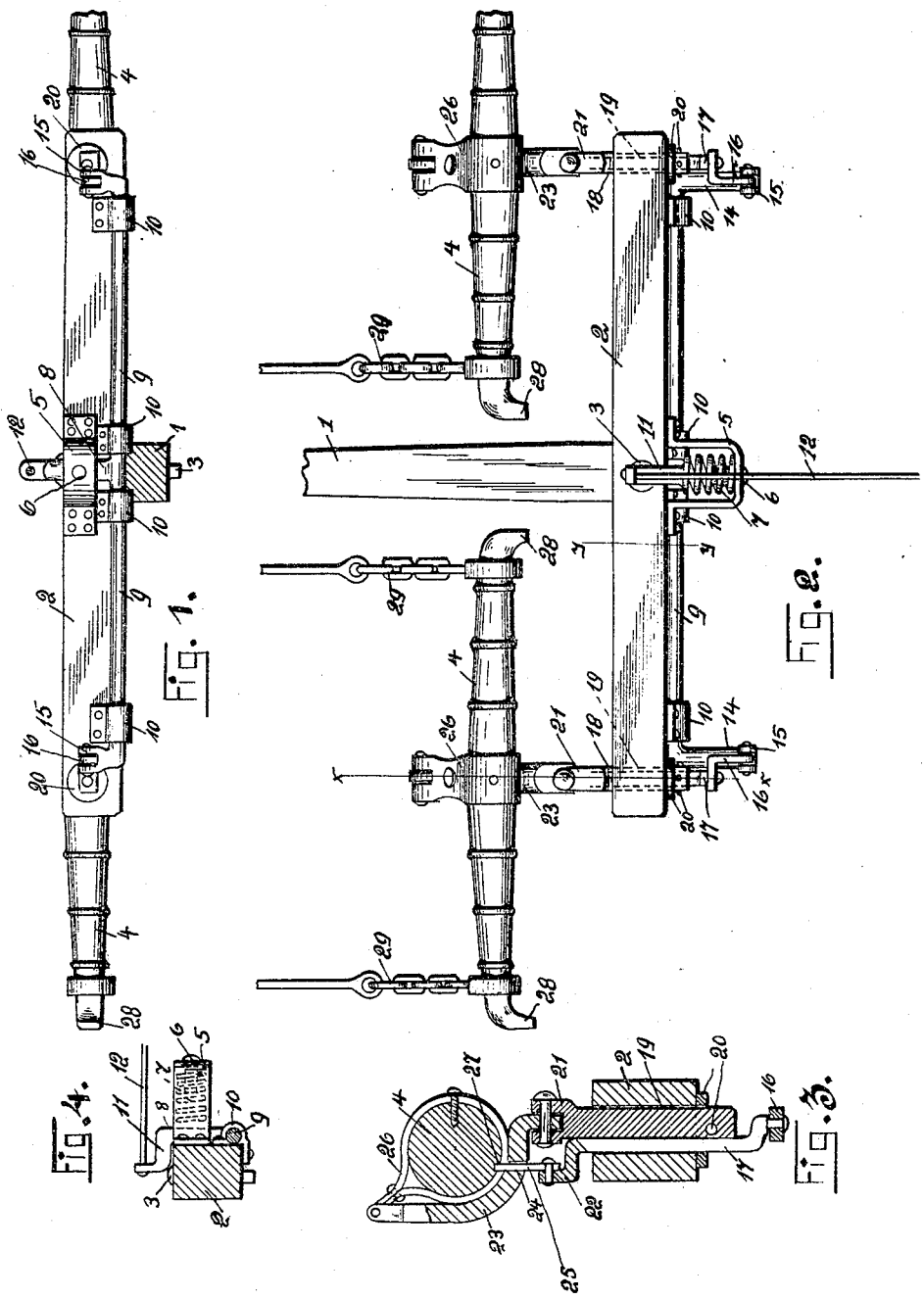

UNITED STATES PATENT OFFICE.

CARL FRENCZEL, OF PITTSBURG, AND GEORGE FLEISCHER, OF HOMESTEAD, PENNSYLVANIA.

HORSE-DETACHER.

SPECIFICATION forming part of Letters Patent No. 784,314, dated March 7, 1905.

Application filed November 10, 1904. Serial No. 232,186.

*To all whom it may concern:*

Be it known that we, CARL FRENCZEL, a subject of the Emperor of Austria-Hungary, residing at Pittsburg, and GEORGE FLEISCHER, a citizen of the United States of America, residing at Homestead, in the county of Allegheny and State of Pennsylvania, have invented certain new and useful Improvements in Horse-Detachers, of which the following is a specification, reference being had therein to the accompanying drawings.

This invention relates to certain new and useful improvements in horse-detachers, and has for its object the provision of novel means in connection with the running-gear of a vehicle to quickly release the animals hitched to said vehicle in case of an accident.

Another object of this invention is to provide novel means in connection with a vehicle for releasing one or more animals from the vehicle should they run away, an accident happen to the vehicle, or should the animals be taken sick.

The device as constructed by us can either be used in connection with the tongue of a vehicle or a pair of shafts, and it is intended to be actuated by a driver of the vehicle when it is desired to release the animals hitched to said vehicle.

The invention finally consists in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 1 is a rear elevation of our improved device. Fig. 2 is a top plan view of the same. Fig. 3 is a vertical sectional view taken on the line *x x* of Fig. 2, and Fig. 4 is a sectional view taken on the line *y y* of Fig. 2.

In the accompanying drawings we have illustrated our improved device as applied to the tongue of a vehicle which carries a doubletree and is adapted to have two animals attached thereto. We do not care to confine ourselves to the use of our improved detacher entirely in connection with a tongued vehicle, but may employ the same in connection with a pair of shafts. The tongue, as designated by the reference-numeral 1, is detached from a vehicle, and upon this tongue is pivotally mounted the doubletree 2, which is retained thereon by the tree-pin 3. Attached to the doubletree 2 are the swingletrees 4 4, and as the mechanism used in connection with each swingletree is identical we will only describe one of said swingletrees and the manner of manipulating the same. Centrally upon the rear face of the doubletree is mounted a substantially U-shaped bracket 5, carrying a pin 6, and mounted upon said pin is a spiral spring 7. Passing upwardly through the bracket 5 is the arm 8 of a rod 9, this rod being mounted in the brackets 10 10, secured upon the lower edge of the rear face of the doubletree. The arm 8 of the rod 9 is bent forwardly, as indicated at 11, and to the end of this arm is attached a chain or rope 12, that is adapted to be of a sufficient length to pass rearwardly to the driver's seat of the vehicle, whereby the same may be grasped at any time to operate the mechanism which will be presently described. The spring 7 is adapted to bear against the arm 8, as clearly illustrated in Fig. 2 of the drawings. The rod 9 extends to each end of the doubletree and is bent outwardly, as indicated at 14, and pivotally mounted in the bifurcated end 15 of said rod is an angle-iron 16, which is connected to a bar 17, slidably mounted adjacent a pin 18, that extends through the opening 19 formed in the end of the doubletree. The pin 18 is retained within the opening by a washer and pin 20. The forward end of the pin 18 is bifurcated, as indicated at 21, while the forward end of the bar 17 is bent downwardly and forwardly, as indicated at 22. In the bifurcated end 21 of the pin 18 is swiveled a curved arm 23, which is provided with an aperture 24 near its swiveled end, and in this aperture is mounted a pin 25, which is swiveled to the downwardly-bent portion 22 of the bar 17. Hinged to the forward end of the curved arm 23 is a central strap 26 of the swingletree 4, and this strap is provided with an opening 27, into which the pin 24 is adapted to normally engage.

Reference will now be had to Fig. 2 of the drawings, wherein we have illustrated the swingletrees, which are constructed in accordance with our invention. It will be observed that the ends of these swingletrees are contracted and bent rearwardly, as indicated at 28 28, forming what may be termed as "hooked" ends, and upon these ends are adapted to be placed the traces 29 29 of the harness carried by the animals hitched to the vehicle.

Operation: In order that the horse-detacher as contemplated by us be fully understood, we will assume that the horses hitched to the vehicle have become frightened and are running away and it is impossible for the driver of the vehicle to stop the horses. The driver then grasps the rope or chain 12 and gives the same a pull which will raise the arm 11 and partially rotate the rod 9. As this arm is raised the spring 7 is compressed and the rearwardly-bent ends 14 of the rod 9 are swung downwardly, which through the medium of the pivoted angle-irons 16 draws the bar 17 through the doubletree and withdraws the pins 25 from the central straps 26 of the swingletrees and permits the swingletrees to swing over, which will place the hooked ends 28 of the swingletrees in such a position that the traces can readily slip off of the same and release the animals from the vehicle. This is accomplished by the hinged connection of the central strap 26 of each trace, and the spring 7 will return the rod 9 and its appurtenant parts to their normal position.

A particular feature of our invention to which we desire to call attention resides in the fact that when the animals are released from the vehicle no part of the swingletrees is injured, and upon the animals being returned to the vehicle the traces can be readily placed upon the swingletrees and the swingletrees returned to their normal position upon the curved arms 23, the pin 25 again engaging in the central straps 26 and retaining the trees in the position illustrated in Fig. 2 of the drawings, whereby the vehicle can again be drawn by the animals.

While we have herein shown the preferred manner of constructing our improved horse-detacher, it is obvious that various changes may be made in the details of construction without departing from the general spirit and scope of the invention.

What we claim, and desire to secure by Letters Patent, is—

1. In a device of the character described, the combination with a doubletree and swingletrees, said swingletrees having hook-shaped ends, of means for hinging said swingletrees to said doubletree so as to swing over, and outwardly from the doubletree, means for locking said swingletrees, and means carried by said doubletree for unlocking said swingletrees whereby the same may swing upon its hinge, substantially as described.

2. In a device of the character described, the combination with a doubletree and swingletrees, said swingletrees having hook-shaped ends, a curved arm pivotally mounted in said doubletrees, said swingletrees being hinged to said curved arms, means for locking said swingletrees upon said curved arms, and means carried by the doubletree to release said locking means, substantially as described.

3. A device of the character described comprising a doubletree and swingletrees, said swingletrees having hook-shaped ends, pins mounted in said doubletree, curved arms swiveled to said pins, said swingletrees being hinged to said curved arms, means for locking said swingletrees in engagement with said curved arms, and means carried by said doubletree, to release said locking means whereby said swingletrees may swing upon their hinges, substantially as described.

4. In a device of the type described, the combination with a doubletree and swingletrees, of pins mounted in said doubletree, a rod mounted upon said doubletree and connected to said pins, curved arms swiveled in the ends of said pins, said swingletrees being hinged to said curved arms and adapted to receive the ends of the traces of a harness, means carried by said doubletree and said swingletrees to release said traces, substantially as described.

5. In a device of the type described, the combination with a doubletree and swingletrees, said swingletrees having curved ends, of a pin mounted upon said doubletree and adapted to be manually actuated, means for retaining said rod in its normal position, pins mounted in the ends of said doubletree, curved arms swiveled in the ends of said pins, said trees being hinged to said curved arms, means carried by said doubletree and curved arms for locking said swingletrees in engagement with said curved arms, and means for releasing said locking means, substantially as described.

In testimony whereof we affix our signatures in the presence of two witnesses.

CARL FRENCZEL.
  GEORGE FLEISCHER.

Witnesses:
 H. C. EVERT,
 K. H. BUTLER.